(12) United States Patent
Fattal et al.

(10) Patent No.: US 7,466,881 B1
(45) Date of Patent: Dec. 16, 2008

(54) OPTICAL SWITCH

(75) Inventors: David A. Fattal, Palo Alto, CA (US); Jong-Souk Yoo, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/827,766

(22) Filed: Jul. 13, 2007

(51) Int. Cl.
*G02B 6/26* (2006.01)
*H01S 3/00* (2006.01)
*H01S 3/083* (2006.01)
*H04J 14/02* (2006.01)

(52) U.S. Cl. .......................... 385/16; 385/14; 385/15; 385/42; 385/131; 385/132; 359/346; 398/82; 398/83; 398/95; 372/94; 372/97

(58) Field of Classification Search ............ 385/15, 385/14, 16, 17, 18, 24, 31, 42, 44, 45, 129, 385/130, 131, 132, 140; 359/346, 347, 341.1; 398/82, 83, 95; 372/94, 97, 98
See application file for complete search history.

(56) References Cited

U.S. PATENT DOCUMENTS

| | | | |
|---|---|---|---|
| 4,720,160 A * | 1/1988 | Hicks, Jr. ................. | 385/31 |
| 5,677,551 A | 10/1997 | Imamura et al. | |
| 5,754,714 A | 5/1998 | Suzuki et al. | |
| 6,101,300 A * | 8/2000 | Fan et al. ................. | 385/27 |
| 6,411,756 B2 * | 6/2002 | Sadot et al. .............. | 385/40 |
| 6,636,668 B1 * | 10/2003 | Al-hemyari et al. ........ | 385/40 |
| 6,665,476 B2 * | 12/2003 | Braun et al. .............. | 385/50 |
| 6,870,970 B2 | 3/2005 | Leonard et al. | |
| 7,026,640 B2 | 4/2006 | Nathan et al. | |
| 7,231,123 B2 * | 6/2007 | Sugita et al. ............. | 385/129 |
| 2003/0068131 A1 * | 4/2003 | Gunn, III ................. | 385/40 |
| 2004/0126072 A1 | 7/2004 | Hoon Lee et al. | |
| 2004/0173883 A1 | 9/2004 | Ohno et al. | |
| 2006/0023997 A1 | 2/2006 | Almeida et al. | |
| 2006/0198416 A1 * | 9/2006 | Yamazaki ................. | 372/94 |

FOREIGN PATENT DOCUMENTS

EP 0723676 B1 4/1998
FR 2724778 A1 3/1996

* cited by examiner

*Primary Examiner*—Brian M Healy

(57) ABSTRACT

An optical switch includes an optical source; a plurality of tunable optical resonators or tunable waveguides in optical communication with the optical source; and a tuning device configured to selectively route an optical beam from the optical source to at least one optical destination by tuning at least one of the optical resonators or tunable waveguides, in optical communication with at least one optical destination, to a wavelength characteristic of the optical beam.

20 Claims, 9 Drawing Sheets

OPTICAL SWITCH

BACKGROUND

Light beams or optical signals are frequently used to transmit digital data, for example, in fiber optic systems for long-distance telephony and internet communication. Additionally, much research has been done regarding the use of optical signals to transmit data between electronic components on circuit boards.

Consequently, optical technology plays a significant role in modern telecommunications and data communication. Examples of optical components used in such systems include optical or light sources such as light emitting diodes and lasers, waveguides, fiber optics, lenses and other optics, photo-detectors and other optical sensors, optically-sensitive semiconductors, optical modulators, and others.

Systems making use of optical components often rely upon the precise manipulation of optical energy, such as a beam of light, to accomplish a desired task. This is especially true in systems utilizing light for high-speed, low-energy communication between two nodes. The manipulation of an optical signal may include selectively encoding information on a light beam of the optical signal and directing the light beam of the optical signal to a sensor that detects the encoded light beam.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
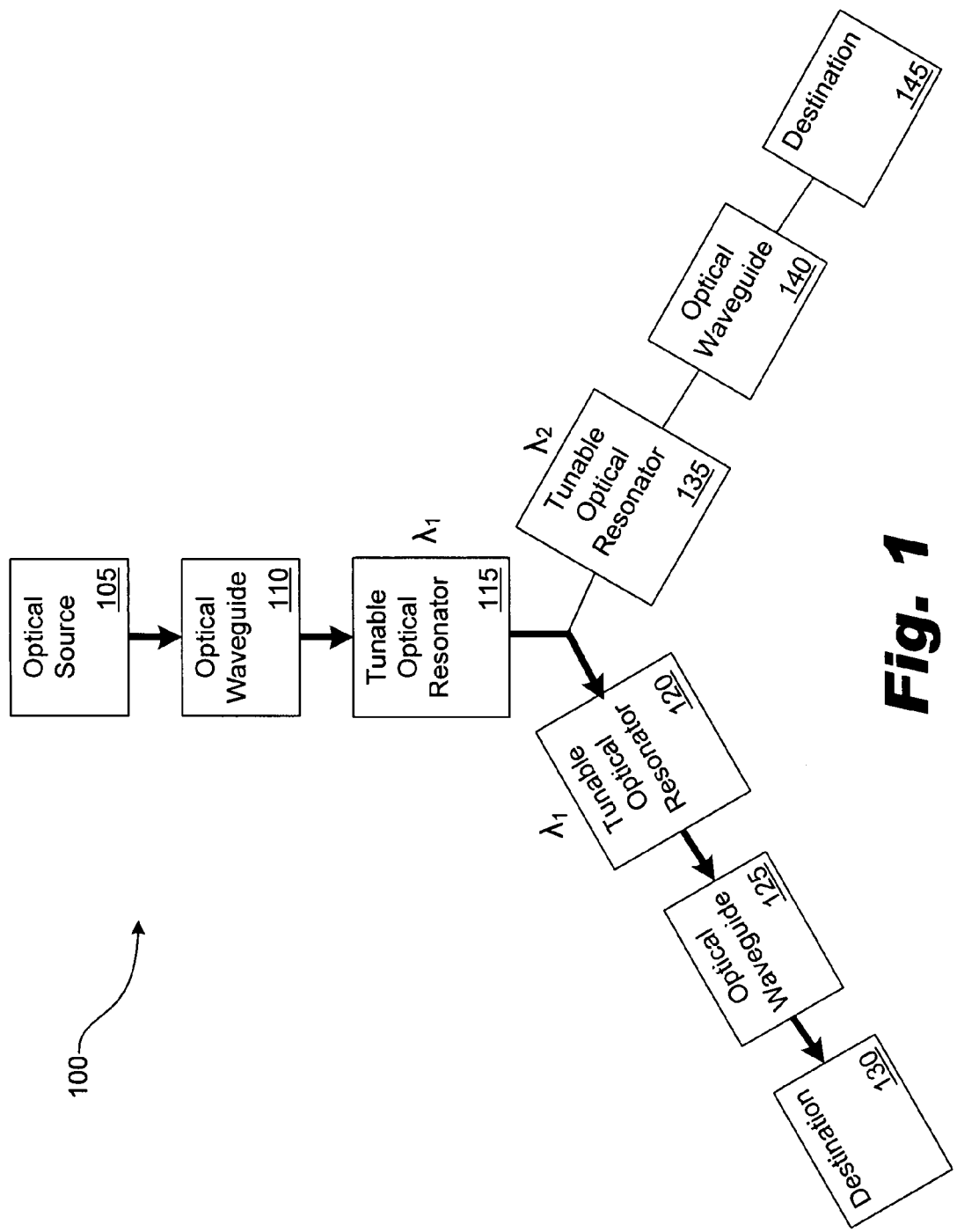
FIG. 1 is a block diagram of an exemplary embodiment of an optical switch, according to principles described herein.

As noted above, optical beams may be used in a variety of applications, including the transmission of digital data. In some such systems, optical beams are directed or redirected in an optical path where they may be received or detected by a designated component. At times, it may be desirable to selectively manipulate an optical beam to one of a number of such paths or possible destinations. Additionally, it may also be desirable to minimize optical impedance, distortion, and/or interference caused by such optical beam manipulations.

Furthermore, many components utilizing optical beams require high-speed, efficient manipulation of the optical beams to function properly. It may, therefore, also be desirable to minimize the amount of time required by such beam manipulation.

To accomplish these and other goals, the present specification discloses systems and methods related to an optical switch having an optical source, a plurality of interconnected tunable optical resonators in communication with the optical source, and a tuning device. The tuning device is configured to selectively route an optical beam from the optical source to at least one optical destination by tuning at least one of the optical resonators to a characteristic wavelength of the optical beam.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical resonator" or "resonant cavity" refers to a structure that sustains optical energy having a certain resonant wavelength or range of wavelengths, and suppresses or attenuates all other optical energy by destructive interference. A "tunable optical resonator" as referred to herein is an optical resonator in which the resonant wavelength or range of wavelengths is selectively adjustable.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical switches and methods of selectively routing an optical beam.

Exemplary Optical Switches

Referring now to FIG. 1, a block diagram of an exemplary optical switch (100) is shown. The exemplary optical switch (100) includes a plurality of interconnected tunable optical resonators (115, 120, 135). The tunable optical resonators (115, 120, 135) are configured such that an optical beam may be transmitted from any of the resonators (115, 120, 135) to another of the resonators (115, 120, 135) when both are tuned to the same resonant wavelength or frequency of optical energy. Examples of suitable optical resonators (115, 120, 135) include, but are not limited to, photonic crystal resonant cavities, ring resonators, Fabry-Perot cavities, mirror resonators, and combinations thereof.

A first tunable optical resonator (115) is in optical communication with an optical source (105) through a first optical waveguide (110). Examples of suitable optical sources include, but are not limited to, vertical cavity surface emitting lasers, diode lasers, light emitting diodes, and combinations thereof.

Second and third tunable optical resonators (120, 135) are in optical communication with first and second optical destinations (130, 145, respectively) through second and third optical waveguides (125, 140, respectively). The optical waveguides (110, 125, 140) are configured to guide optical beams over a given path with minimal optical losses, impedance, interference from other optical energy, and distortion. As will be understood by those skilled in the art, examples of suitable optical waveguides (110, 125, 140) for this purpose include, but are not limited to, photonic crystal waveguides, dielectric slab waveguides, rectangular waveguides, optical fiber, combinations thereof, and the like. Moreover, in some embodiments, one or more of the optical waveguides (110, 125, 140) may be configured to conduct optical beams or energy having only a certain wavelength or range of wavelengths. In other embodiments, the optical waveguides (110, 125, 140) may be configured to conduct optical beams of all wavelengths.

As mentioned above, each of the first, second, and third tunable optical resonators (115, 120, 135) may be tuned to conduct a specific wavelength or range of wavelengths of optical energy. Optical energy having a wavelength to which one of the optical resonators (115, 120, 135) is tuned may be conducted to another of the tunable optical resonators (115, 120, 135) that is tuned to the same specific wavelength or to a range of wavelengths that includes the same specific wavelength.

In many embodiments, the tunable optical resonators (115, 120, 135) may be selectively tuned to a desired wavelength or range of wavelengths by selective injection and depletion of electrostatic charge locally to portions of the tunable optical resonators (115, 120, 135). As is understood by those familiar with the art, this charge carrier injection may be performed using an electrical source to physically manipulate charge carriers in desired regions of the resonators (115, 120, 135). In other embodiments, the optical resonators (115, 120, 135) may be tuned by exploiting an optical non-linearity of material in the resonators (115, 120, 135) using an external optical energy source to selectively energize desired regions of the resonators (115, 120, 135). Furthermore, the tunable optical resonators (115, 120, 135) may also be selectively tuned to desired wavelengths or ranges of wavelengths by altering the temperature of specific regions of the resonators (115, 120, 135).

Using the properties of the optical resonators (115, 120, 135), an optical beam from the optical source (105) may be directed in this example to one of two possible destinations (130, 145). At the destinations (130, 145), the optical beam may be detected, sensed, decoded, manipulated, and/or subsequently rerouted to another destination. The optical beam of the present example is shown routed through the optical switch (100) from the optical source (105) to the first destination (130). The path of the optical beam is indicated by the bold arrows.

The optical beam is routed to an intended destination by tuning both the optical resonator (115) in communication with the optical source (105) and the optical resonator (120) in communication with the first destination (130) to a wavelength ($\lambda_1$) characteristic of the optical beam emitted by the optical source (105). Furthermore, the optical resonator (135) in communication with the second destination (145) is tuned to a wavelength ($\lambda_2$), sufficiently distinct from the wavelength ($\lambda_1$) characteristic of the optical beam, such that substantially no optical energy from the optical source (105) is transmitted through the optical resonator (135) in communication with the second destination (145), and by extension, to the second destination (145).

Figure 2:
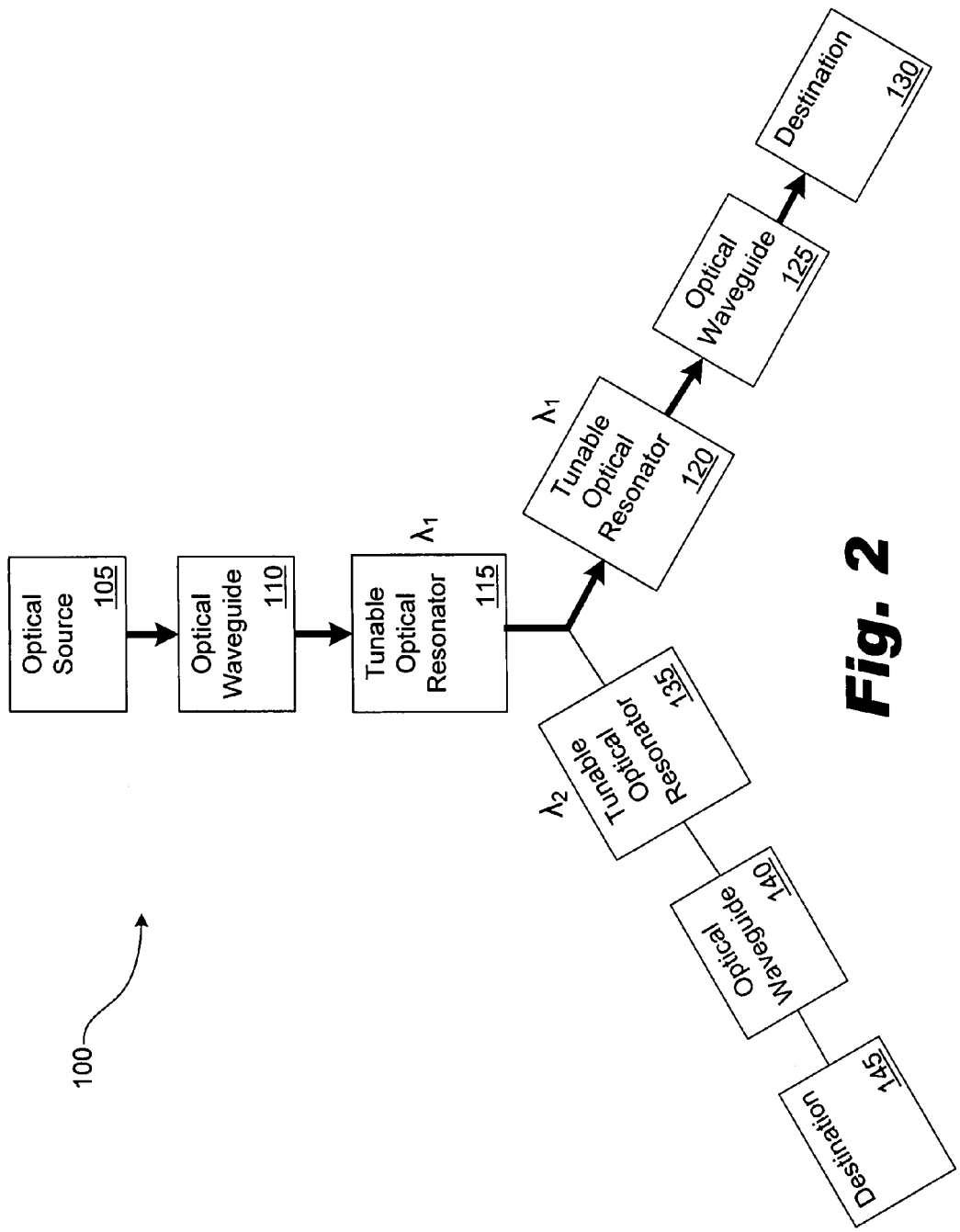
FIG. 2 is a block diagram of an exemplary embodiment of an optical switch, according to principles described herein.

Referring now to FIG. 2, the optical switch (100) is shown configured to route an optical beam from the optical source (105) to the second destination (145); the path of the optical beam is represented by the arrows. This is done by tuning the optical resonator (115) in communication with the optical source (105) and the optical resonator (135) in communication with the second destination (145) to the wavelength ($\lambda_1$) characteristic of the optical beam emitted by the optical source (105). Furthermore, the optical resonator (120) in communication with the first destination (130) is tuned to a wavelength ($\lambda_2$), sufficiently distinct from the wavelength ($\lambda_1$) characteristic of the optical beam, that substantially no optical beam from the optical source (105) is transmitted through the optical resonator (120) in communication with the first destination (130), and by extension, to the first destination (130). As used herein and in the appended claims, an optical destination, or simply "destination," may include, but is not limited to, a photodetector, photosensor, photodiode, waveguide, fiber optic, mirror, lens, or any other component or element that receives an optical beam.

Figure 3:
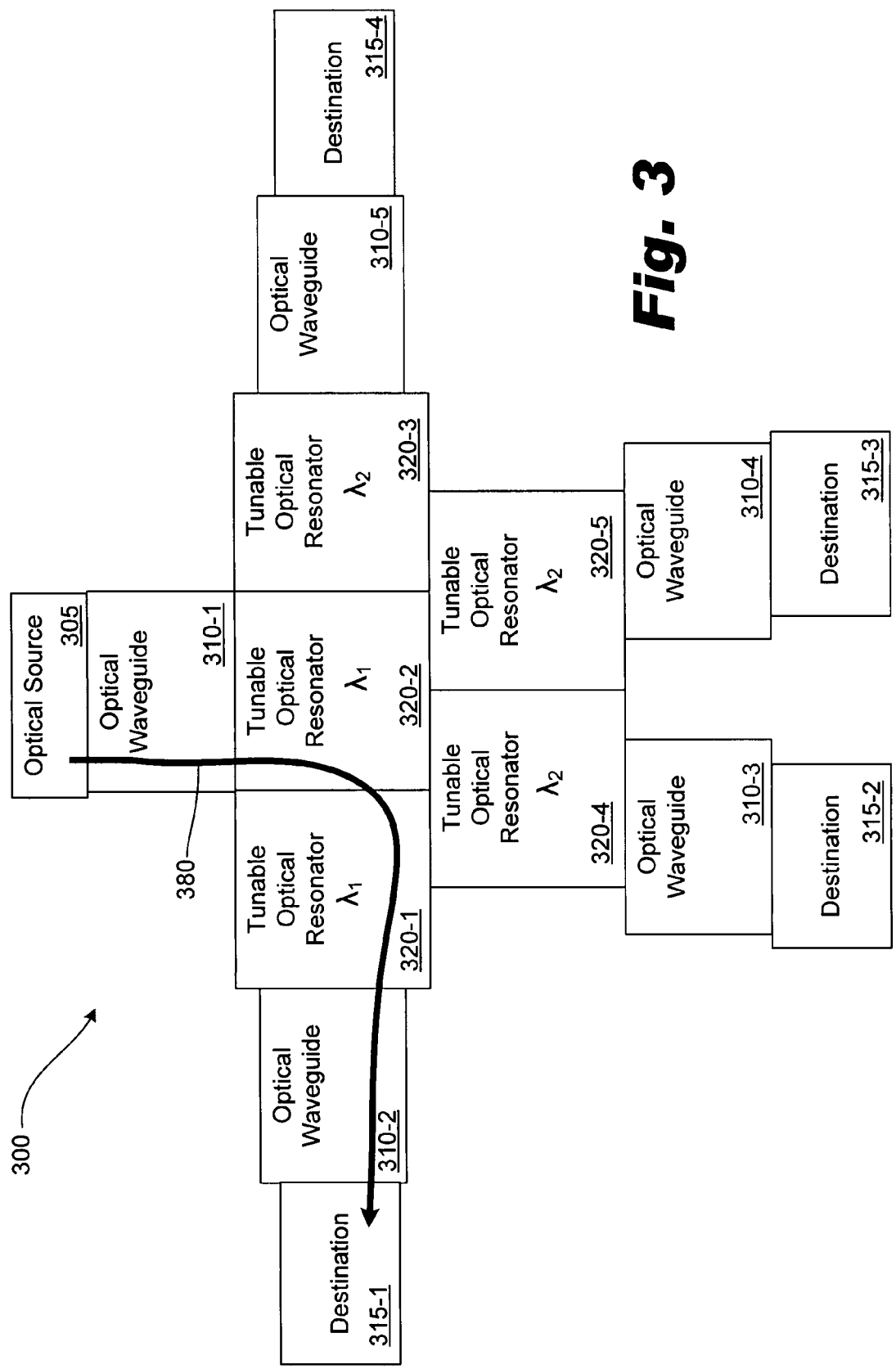
FIG. 3 is a block diagram of an exemplary embodiment of an optical switch, according to principles described herein.

Referring now to FIG. 3, an exemplary optical switch (300) having four possible destinations (315) is shown. The possible destinations (315) are in communication with a plurality of interconnected tunable optical resonators (320) through corresponding optical waveguides (310).

The exemplary optical switch includes an optical source (305) in communication with the plurality of interconnected tunable optical resonators (320) through an optical waveguide (310-1), as described previously. An optical beam from the optical source (305) may be routed to any one of the possible destinations (315) by tuning the optical resonator (320-2) in communication with the optical source and a tunable optical resonator (320) in communication with the intended destination to conduct optical energy having a wavelength characteristic of the optical source (305). To ensure that the optical beam is only routed to an intended destination (315), the other optical resonators (320), associated with other possible destinations (315), may be tuned to reject optical energy having the wavelength characteristic of the optical source (305).

The optical switch (305) is shown in a configuration that routes an optical beam (380) from the optical source (305) to a first destination (315-1). The optical source (305) is configured to emit an optical beam having a first wavelength ($\lambda_1$). The tunable optical resonator (320-2) in communication with the optical source (305) and the tunable optical resonator (320-1) in communication with the first destination (315-1) are therefore tuned to allow the passage of optical energy having the first wavelength ($\lambda_1$). The remaining optical resonators (320-3, 320-4, 320-5) are tuned to a second wavelength ($\lambda_2$) substantially different from the wavelength ($\lambda_1$), such that the optical energy from the optical source (305) will not be conducted through the remaining optical resonators (320-3, 320-4, 320-5).

Figure 4:
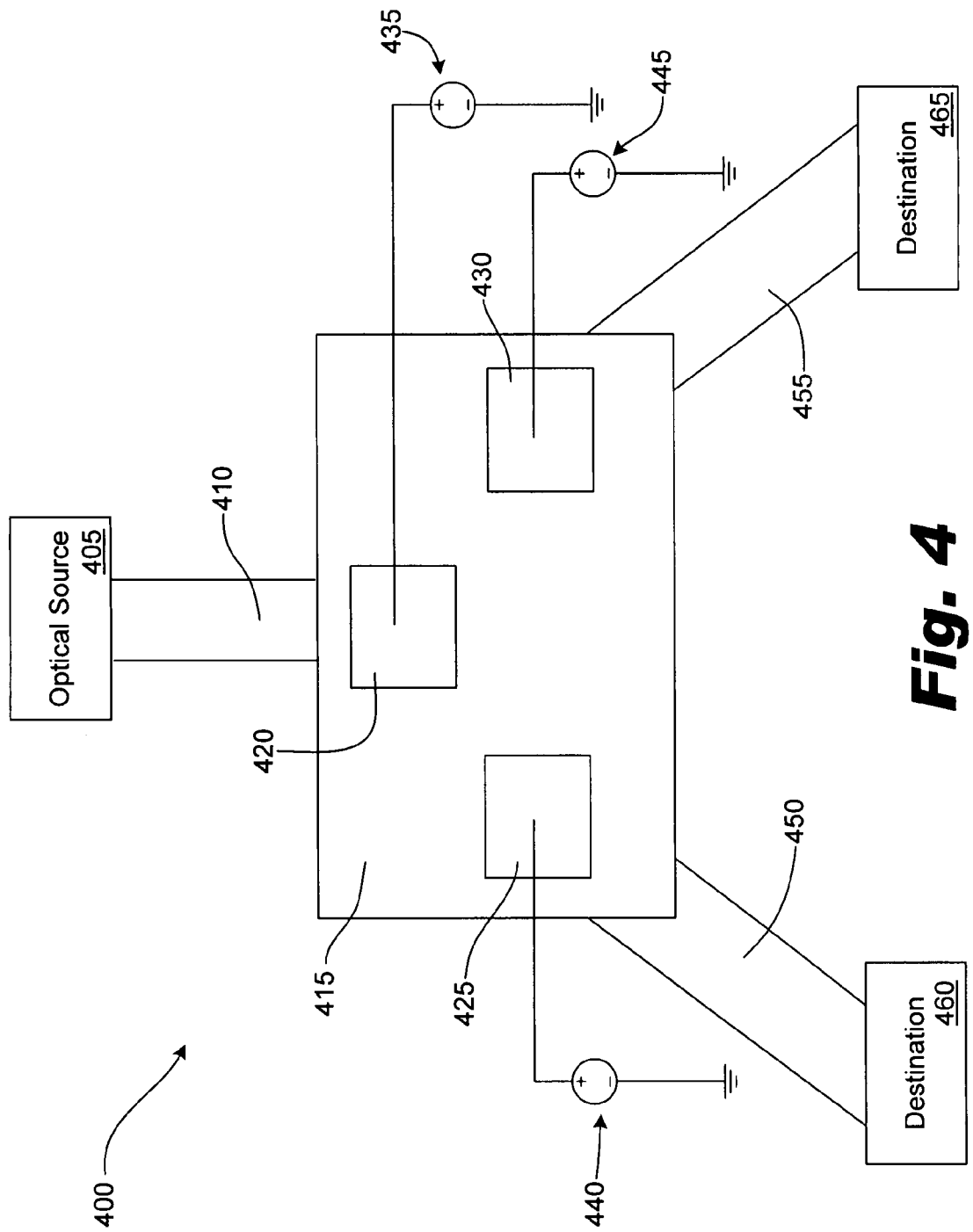
FIG. 4 is a diagram of an exemplary embodiment of an optical switch, according to principles described herein.

Referring now to FIG. 4, an exemplary optical switch (400) is shown. The exemplary optical switch (400) is configured to selectively route an optical beam from an optical source (405) to one of two alternative destinations (460, 465). The optical switch (400) includes an optical body (415) having three interconnected tunable optical resonators, and operates according to the principles described in relation to FIGS. 1-2. The optical source (405) and both of the destinations (460, 460) are each in communication with one of the tunable resonators through corresponding optical waveguides (410, 450, 455).

In FIG. 4, each of the tunable optical resonators is associated with a charge injection region (420, 425, 430). In the illustrated example, each resonator may be located in the general vicinity of an illustrated injection region (420, 425, 430). The tunable optical resonators may be selectively tuned to allow passage (and conversely, rejection) of optical energy having certain wavelengths by selectively injecting and depleting electric charge locally in the three different charge injection regions (420, 425, 430). Electrical sources (435, 440, 445) are in electrical communication with the charge injection regions (420, 425, 430). Charge may then be selectively injected or depleted from the charge injection regions (420, 425, 430) by varying the voltage of the electrical sources (435, 440, 445).

The charge injection regions (420, 425, 430) may maintain functionality at very small scales, and thus have very low capacitance. Therefore, in some embodiments, the charge injection regions (420, 425, 430) may have very low charging time constants and charging energy, thus providing a very high speed optical switch. Other factors affecting the speed at which an optical beam may be switched from one of the destinations (460, 465) to another include, but are not limited to, the quality ("Q" factor) of the optical resonators, the geometric arrangement of the optical resonators, and optical waveguide coupling. In some embodiments, it is conceivable that the optical beam may be switched at rates of greater than 1 Terahertz.

Figure 5:
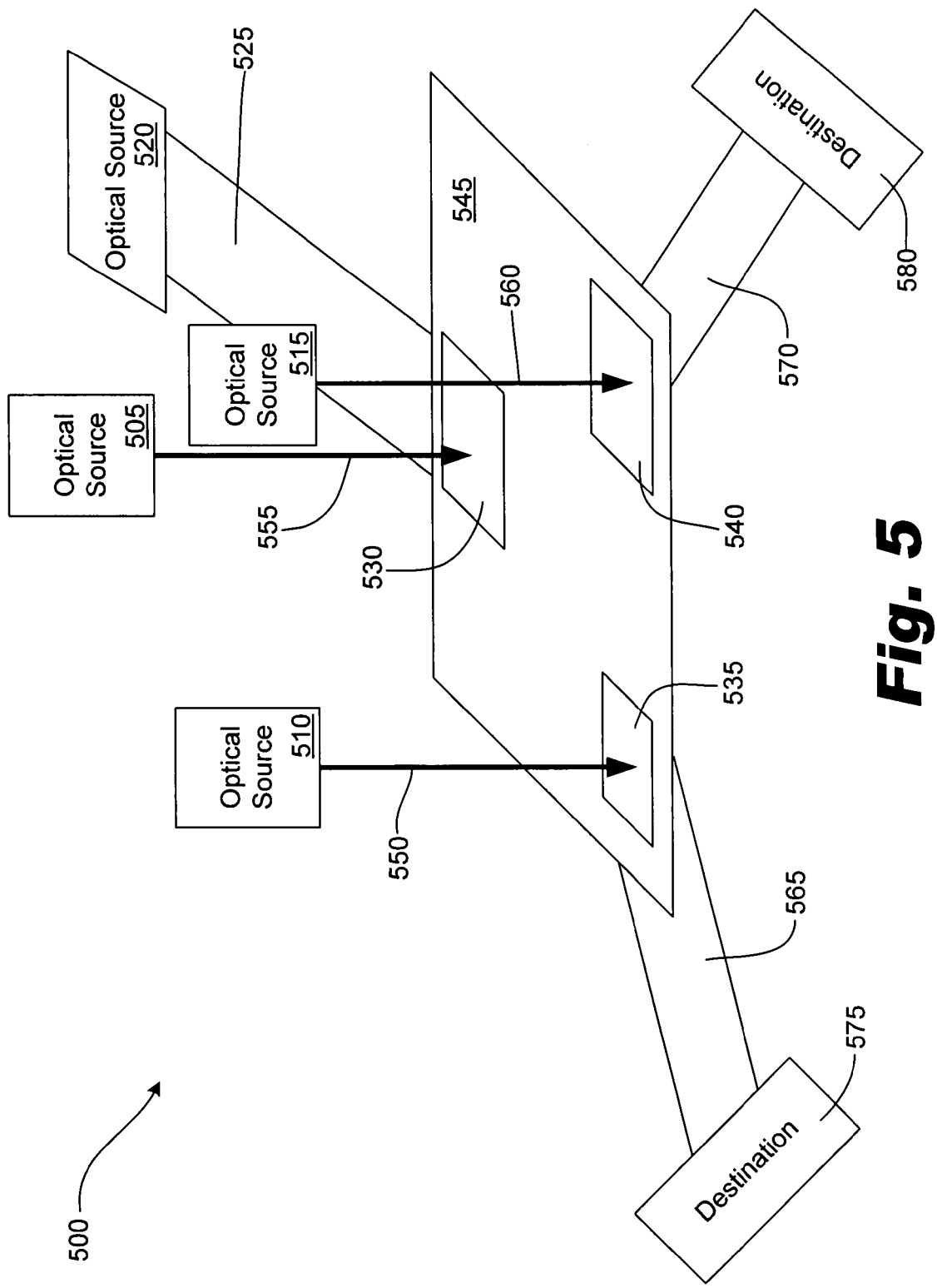
FIG. 5 is a diagram of an exemplary embodiment of an optical switch, according to principles described herein.

Referring now to FIG. 5, another exemplary optical switch (500) is shown. Similar to the embodiment shown and described in FIG. 4, the exemplary optical switch (500) is configured to selectively route an optical beam from an optical source (520) to one of two alternative destinations (575, 580).

The optical switch (500) includes an optical body (545) having three interconnected tunable optical resonators, and operates according to the principles described in relation to FIGS. 1-2. As above, in FIG. 5, each of the tunable optical resonators is associated with a charge injection region (420, 435, 430). In the illustrated example, each resonator may be located in the general vicinity of an illustrated charge injection region (530, 535, 540). The optical source (520) and both of the destinations (575, 580) are each in communication with one of the tunable resonators through corresponding optical waveguides (525, 565, 570, respectively).

The tunable optical resonators may be selectively tuned to allow passage (and conversely, rejection) of optical energy having certain wavelengths by selectively injecting and depleting electric charge locally in three different charge injection regions (530, 535, 540). Each of the regions (530, 535, 540) in this example is photosensitive or photoactive, generating or releasing a charge in response to an incident optical beam. As in the examples above, each such region (530, 535, 540) is located adjacent to a corresponding optical resonator. Optical sources (505, 510, 515) are in optical communication with the regions (530, 535, 540). Charge may then be selectively injected or depleted from the photosensitive regions (530, 535, 540) optically by selectively directing the intensity and amount of optical beams (550, 555, 560) emitted by the optical sources (505, 510, 515) to the charge injection regions (530, 535, 540).

In some embodiments, the optical cavities may be selectively tuned by selectively varying the temperature of localized regions.

Figure 6:
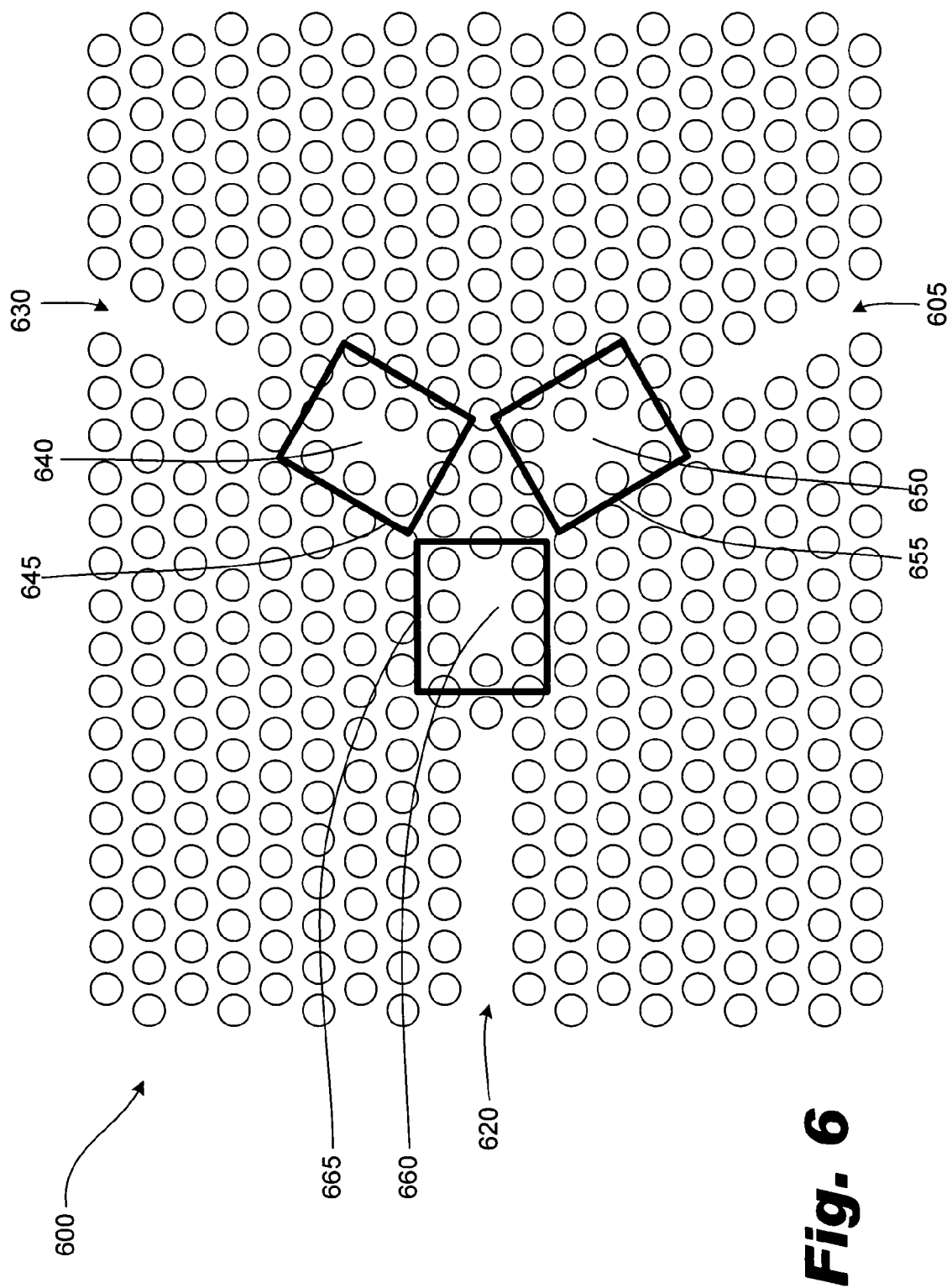
FIG. 6 is an illustration of an exemplary embodiment of an optical switch, according to principles described herein.

Referring now to FIG. 6, an exemplary optical switch (600) consistent with the principles of the preceding figures is shown. The exemplary optical switch (600) is implemented using photonic crystals. As will be understood by those skilled in the art, a photonic crystal is a body including at least two materials having different indices of refraction arranged in a periodic structure such that an optical band-gap property is exhibited. As will be further understood by those skilled in the art, local optical resonators may be formed in photonic crystal bodies by introducing localized defects in the periodic structure.

A main photonic crystal body (615) includes three interconnected optical resonators (640, 650, 660). Each of the optical resonators (640, 650, 660) is in communication, respectively, with one of an optical source, a first destination, and a second destination through photonic crystal waveguides (605, 620, 630).

The optical resonators (640, 650, 660) may be selectively tuned to conduct or reject optical energy of desired wavelengths through the selective injection and depletion of electrical charge, optical energy, or thermal energy at tuning regions (645, 655, 665) disposed adjacent, e.g., above and/or beneath, the optical resonators (640, 650, 660) in the photonic crystal body (615). Consequently, an optical beam from an optical source may enter the photonic crystal body (615) at one of the optical waveguides (605, 620, 630) and be selectively routed to exit the photonic crystal body through another of the optical waveguides (605, 620, 630) by tuning the optical resonators (640, 650, 660) according to principles previously described.

Figure 7:
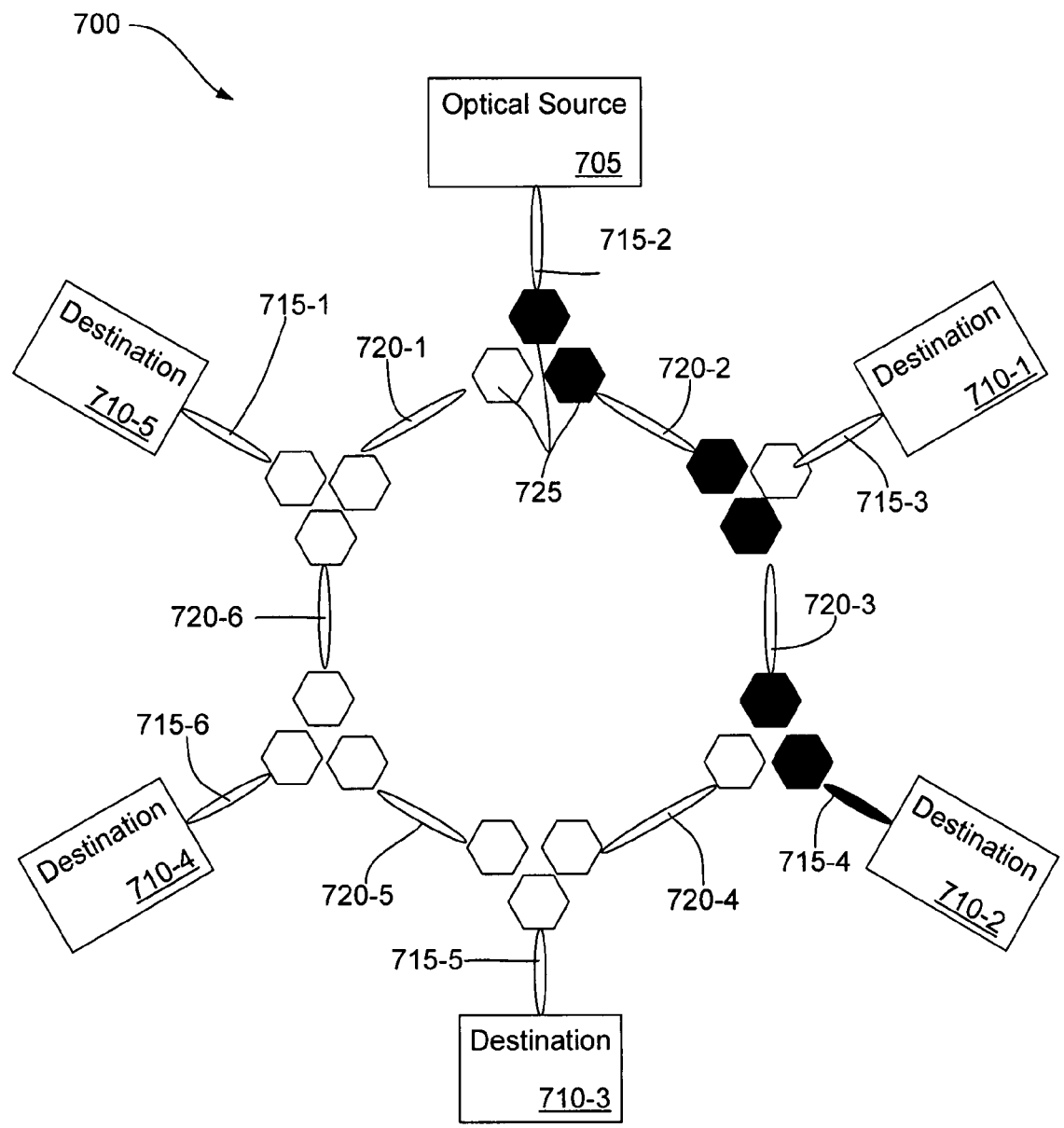
FIG. 7 is an illustration of an exemplary embodiment of an optical switch, according to principles described herein.

Referring now to FIG. 7, another exemplary optical switch (700) is shown. The optical switch (700) may be used to selectively route an optical beam from an optical source (705) to one of five possible destinations (710). The optical switch (700) includes a plurality of interconnected tunable optical resonators (725), as previously described. Each of the tunable optical resonators (725) includes at least one electrode (not shown) for selective injection and depletion of charge within the tunable resonators (725) to allow the passage or rejection of a certain wavelength or range of wavelengths of optical energy. Groups of interconnected optical resonators (725) are interconnected with optical waveguides (720). Additionally, optical waveguides (720) may be used to connect the optical source (705) and the destinations (710) to groups of interconnected optical resonators (725).

The exemplary optical switch (700) is shown configured to route an optical beam from the optical source (705) to a destination (710-2). This is accomplished by selectively tuning certain of the optical resonators (720), marked in the figure by a black fill color, to pass optical energy having the characteristic wavelength of the optical beam emitted by the optical source (705).

Figure 8:
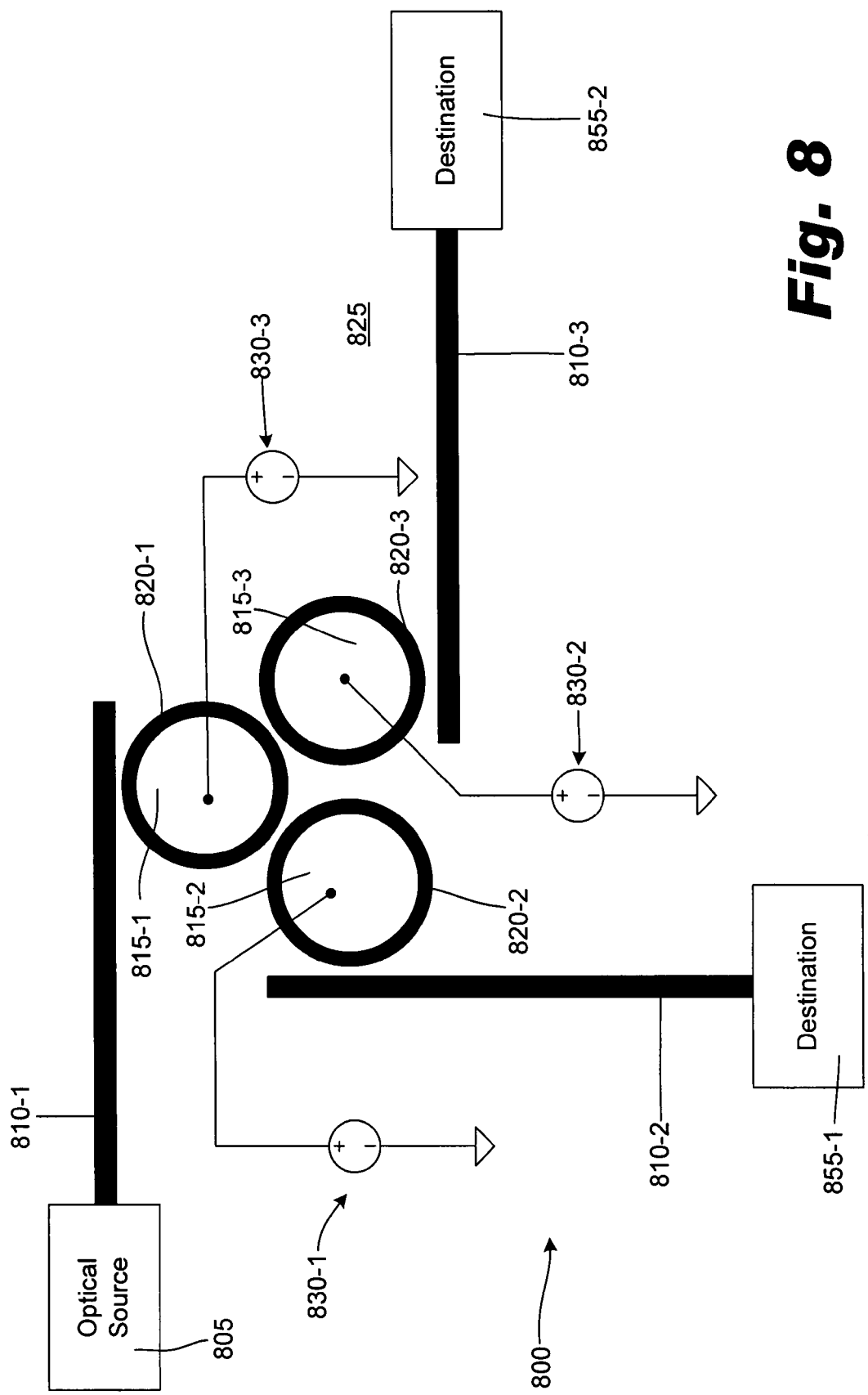
FIG. 8 is an illustration of an exemplary embodiment of an optical switch, according to principles described herein.

Referring now to FIG. 8, another exemplary optical switch (800) is shown. The optical switch (800) is configured to selectively route an optical beam from an optical source (805) to one of two possible destinations (855). The exemplary optical switch (800) is implemented using ring resonators (820). Each of the optical source (805) and the two possible destinations (855) is in optical communication with an associated ring resonator (820) through an optical waveguide (810). The ring resonators (820) are in optical communication with each other such that, under correct tuning conditions, an optical signal from the optical source (805) may be routed from a first waveguide (810-1) to a first ring resonator (820-1) and one of a second or third ring resonator (810-2, 810-3) and corresponding destination (855).

The ring resonators (820) may be selectively tuned to pass optical energy of a certain wavelength or range of wavelengths by selectively injecting or depleting charge from doped regions (815) using electrical sources (830). By selectively tuning each of the ring resonators (860), an optical signal from the optical source (805) may be selectively routed to any of the possible destinations (855), in accordance with the principles described previously.

Exemplary Method

Figure 9:
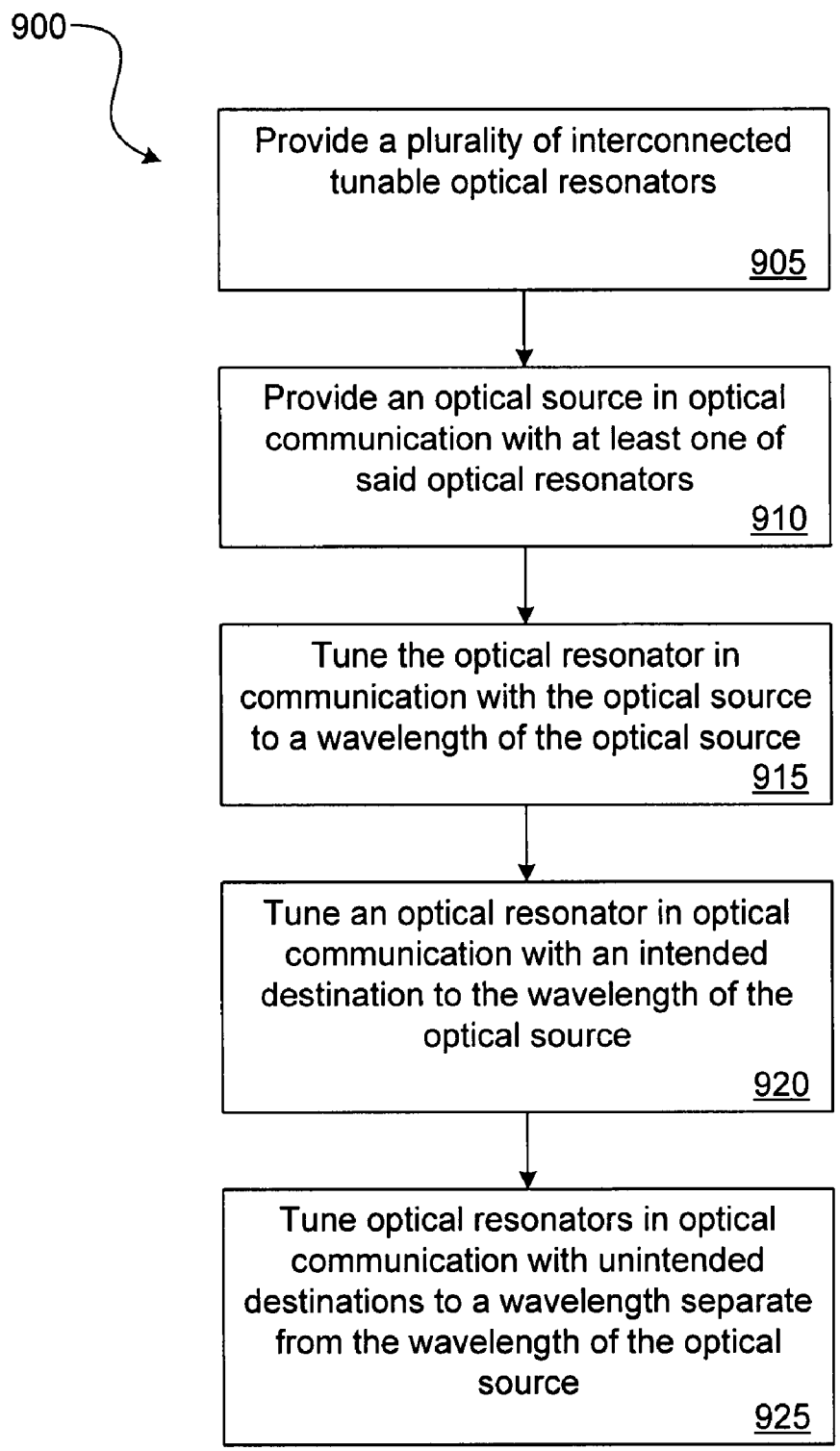
FIG. 9 is a flowchart illustrating an exemplary method of selectively routing an optical beam, according to principles described herein.

Referring now to FIG. 9, a flowchart illustrating an exemplary method (900) of selectively routing an optical beam is shown. The method (900) includes providing (step 905) a plurality of interconnected tunable optical resonators or waveguides and providing (step 910) an optical source in optical communication with at least one of the optical resonators or tunable waveguides.

The optical resonator in communication with the optical source is tuned (step 915) to a wavelength characteristic of the optical source. An optical resonator or tunable waveguide in optical communication with an intended destination is also tuned (step 920) to the wavelength characteristic of the optical source. Optical resonators in optical communication with unintended destinations are tuned (step 925) to a wavelength substantially separate and distinct from the wavelength characteristic of the optical source to prevent an optical signal from the optical source from being transmitted to the unintended destinations.

The tunable optical resonators may be tuned by selectively injecting and depleting charge. In some embodiments, this may be accomplished using at least one electrical source in electrical communications with the optical resonators. In other embodiments, the tunable optical resonators may be tuned by selectively altering the temperature of the optical resonators. In other embodiments, tunable waveguides may be used as described above in connection with FIG. 8.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical switch, comprising:
   an optical source;
   at least three interconnected tunable optical resonators or tunable waveguides, wherein a first tunable optical resonator or tunable waveguide is optically coupled to said optical source and each remaining tunable optical resonator or tunable waveguide is optically coupled to one of a plurality of respective optical destinations; and
   a tuning device configured to selectively route an optical beam from said optical source to at least one of said optical destinations by tuning at least said first tunable optical resonator or tunable waveguide and at least one of said remaining tunable optical resonators or tunable waveguides to a wavelength characteristic of said optical beam.

2. The optical switch of claim 1, wherein said tunable optical resonators are selected from the group consisting of: photonic crystal resonant cavities, ring resonators, Fabry-Perot cavities, mirror resonators, and combinations thereof.

3. The optical switch of claim 1, wherein said tunable waveguides each comprise an associated ring resonator.

4. The optical switch of claim 1, wherein said optical source is in optical communication with said first tunable optical resonator through at least one optical waveguide.

5. The optical switch of claim 1, wherein said tuning device is configured to selectively inject and deplete charge locally from at least a portion of each of said tunable optical resonators or tunable waveguides.

6. The optical switch of claim 5, wherein said tuning device comprises an electrical source.

7. The optical switch of claim 5, wherein said tuning device comprises at least one additional optical source configured to selectively direct optical beams to at least a portion of said tunable optical resonators or tunable waveguides to control an electrical charge at those resonators or tunable waveguides.

8. An optical switch, comprising:
   a photonic crystal body having a first optical resonant cavity in communication with an optical source and a plurality of additional optical resonant cavities in communication with a respective plurality of optical destinations; and
   a tuning device configured to selectively route an optical beam from said optical source to at least one of said optical destinations by tuning said first optical resonant cavity and at least one of said additional optical resonant cavities to a characteristic wavelength of said optical beam.

9. The optical switch of claim 8, wherein said photonic crystal body comprises a substantially periodic variation between at least two materials having different indices of refraction.

10. The optical switch of claim 9, wherein each of said optical resonant cavities comprises at least one point defect in said substantially periodic variation.

11. The optical switch of claim 8, wherein said tuning device comprises at least one electrical source in electrical communication with said point defects, wherein said at least one electrical source is configured to selectively inject and deplete charge in said optical resonant cavities.

12. The optical switch of claim 8, wherein said tuning device comprises a plurality of optical sources configured to selectively inject and deplete charge optically in said optical resonant cavities.

13. The optical switch of claim 8, wherein said tuning device is configured to tune said optical resonant cavities by selectively altering temperature in said cavities.

14. The optical switch of claim 8, wherein said tuning device is configured to selectively tune said optical resonant cavities at a rate of at least 1 THz.

15. A method of selectively routing an optical beam, comprising:
   providing at least three interconnected tunable optical resonators or tunable waveguides;
   providing an optical source in optical communication with at least one of said tunable optical resonators or tunable waveguides;
   providing a plurality of optical destinations, each said optical destination being in optical communication with a respective remaining tunable optical resonator or tunable waveguide;
   tuning a said tunable optical resonator or tunable waveguide that is in communication with said optical source to a characteristic wavelength of said optical source; and
   tuning a said tunable optical resonator or waveguide that is in optical communication with an intended destination to said characteristic wavelength.

16. The method of claim 15, wherein said tunable optical resonators are tuned by selectively injecting and depleting charge from said resonators.

17. The method of claim 16, wherein said charge is selectively injected and depleted using optical sources configured to selectively shine optical energy on said optical resonators.

18. The method of claim 15, wherein said tunable optical resonators are tuned by selectively altering a temperature of said resonators.

19. The method of claim 15, further comprising the step of tuning optical resonators in said plurality that are not in communication with said intended destination to a second wavelength separate and distinct from said characteristic wavelength of said optical source.

20. The method of claim 15, wherein tuning each said tunable waveguide comprises controlling a ring resonator associated with that tunable waveguide.

* * * * *

UNITED STATES PATENT AND TRADEMARK OFFICE
CERTIFICATE OF CORRECTION

PATENT NO.         : 7,466,881 B1
APPLICATION NO. : 11/827766
DATED               : December 16, 2008
INVENTOR(S)        : David A. Fattal et al.

It is certified that error appears in the above-identified patent and that said Letters Patent is hereby corrected as shown below:

On the face page, in field (75), in "Inventors", in column 1, line 2, delete "Jong-Souk Yoo" and insert -- Jong-Souk Yeo --, therefor.

Signed and Sealed this

Fourteenth Day of July, 2009

JOHN DOLL
*Acting Director of the United States Patent and Trademark Office*